(12) United States Patent
Hardesty et al.

(10) Patent No.: US 10,408,495 B2
(45) Date of Patent: Sep. 10, 2019

(54) COMPANION WATER HEATER

(71) Applicants: Ryan Hardesty, Valparaiso, IN (US); Dan Karch, La Porte, IN (US); David King, Michigan City, IN (US); Aaron Smith, La Porte, IN (US)

(72) Inventors: Ryan Hardesty, Valparaiso, IN (US); Dan Karch, La Porte, IN (US); David King, Michigan City, IN (US); Aaron Smith, La Porte, IN (US)

(73) Assignee: The Marley-Wylain Company, Michigan City, IN (US)

( * ) Notice: Subject to any disclaimer, the term of this patent is extended or adjusted under 35 U.S.C. 154(b) by 0 days.

(21) Appl. No.: 14/163,561

(22) Filed: Jan. 24, 2014

(65) Prior Publication Data

US 2014/0209041 A1 Jul. 31, 2014

Related U.S. Application Data

(60) Provisional application No. 61/757,056, filed on Jan. 25, 2013.

(51) Int. Cl.
| | |
|---|---|
| F24H 9/20 | (2006.01) |
| F24H 1/18 | (2006.01) |
| F24H 9/12 | (2006.01) |
| F24H 1/20 | (2006.01) |
| F24H 9/14 | (2006.01) |
| F24H 1/22 | (2006.01) |

(Continued)

(52) U.S. Cl.
CPC ......... *F24H 1/186* (2013.01); *F24D 17/0026* (2013.01); *F24D 17/0089* (2013.01); *F24D 19/1051* (2013.01); *F24H 1/18* (2013.01); *F24H 1/208* (2013.01); *F24H 1/22* (2013.01); *F24H 9/124* (2013.01); *F24H 9/148* (2013.01); *F24H 9/2007* (2013.01); *G05D 23/1931* (2013.01); *F24H 1/182* (2013.01)

(58) Field of Classification Search
USPC ...................................... 122/14.3, 18.5, 19.1
See application file for complete search history.

(56) References Cited

U.S. PATENT DOCUMENTS

| | | |
|---|---|---|
| 1,963,624 A | 6/1934 | Kroger |
| 2,373,196 A | 4/1945 | Osterheld |

(Continued)

FOREIGN PATENT DOCUMENTS

WO 20060130929 A1 12/2006

OTHER PUBLICATIONS

PCT International Search Report and the Written Opinion of the International Searching Authority dated Jul. 28, 2014 for PCT/US2014/012943.

(Continued)

*Primary Examiner* — Steven B McAllister
*Assistant Examiner* — John E Bargero
(74) *Attorney, Agent, or Firm* — BakerHostetler

(57) ABSTRACT

A hot water heater appliance includes a boiler, a companion water heater and a controller. The controller is configured to control the water heater appliance in response to a scheduled plurality of performance modes based on a preset schedule. A first performance mode is scheduled to be performed at an expected low usage time and a second performance mode is scheduled to be performed at an expected high usage time relative to the expected low usage time.

18 Claims, 4 Drawing Sheets

(51) Int. Cl.
  *F24D 17/00* (2006.01)
  *F24D 19/10* (2006.01)
  *G05D 23/19* (2006.01)

(56) References Cited

U.S. PATENT DOCUMENTS

| | | | |
|---|---|---|---|
| 3,461,854 A | 8/1969 | Henry et al. | |
| 3,530,837 A * | 9/1970 | Olney | 122/504 |
| 3,625,187 A | 12/1971 | Viessmann | |
| 4,194,627 A | 3/1980 | Christensen | |
| 4,620,667 A | 11/1986 | Vandermeyden et al. | |
| 4,768,678 A | 9/1988 | Nusbaumer et al. | |
| 4,823,769 A | 4/1989 | Semaan | |
| 4,992,223 A | 2/1991 | Nelson | |
| 5,052,347 A | 10/1991 | Nelson | |
| 5,208,964 A | 5/1993 | Nelson | |
| 5,229,048 A | 7/1993 | Nelson | |
| 5,442,157 A * | 8/1995 | Jackson | 219/492 |
| 5,601,204 A | 2/1997 | Hall | |
| 6,148,774 A | 11/2000 | Neill et al. | |
| 7,346,274 B2 * | 3/2008 | Bradenbaugh | 392/478 |
| 7,621,239 B2 | 11/2009 | Rice | |
| 2004/0069768 A1 | 4/2004 | Patterson et al. | |
| 2007/0131117 A1 | 6/2007 | Rittberg | |
| 2008/0197205 A1 * | 8/2008 | Ene | F24H 1/43 237/19 |
| 2010/0116224 A1 | 5/2010 | Leeland | |
| 2011/0123179 A1 * | 5/2011 | Roetker et al. | 392/441 |
| 2012/0060771 A1 * | 3/2012 | Brian | F24D 19/1063 122/14.1 |
| 2014/0144919 A1 | 5/2014 | Al-Dhafiri | |

OTHER PUBLICATIONS

U.S. Office Action dated Aug. 11, 2015, in U.S. Appl. No. 14/163,793.

* cited by examiner

COMPANION WATER HEATER

CROSS REFERENCE TO RELATED APPLICATIONS

This application claims priority to U.S. Provisional Application Ser. No. 61/757,056, filed on Jan. 25, 2013, titled "COMPANION WATER HEATER FOR WM97+ GAS-FIRED BOILERS," the disclosure of which is incorporated herein by reference in its entirety.

FIELD OF THE INVENTION

This invention relates generally to a hot water heater. More particularly, the present invention relates, for example, to a water heater for use with a suitable boiler.

BACKGROUND OF THE INVENTION

Generally, domestic hot water is supplied via a water heater appliance that is sized for the expected hot water draw. Insufficient hot water can strongly negatively affect the comfort of any occupants of the residence and lead to frustration and/or an expensive replacement of the appliance. However, excessive hot water capacity can lead to energy inefficiencies and poor performance. Examples of water heater appliances include traditional hot water heater tanks, 'instant' hot water heaters which are often called 'tankless water heaters', and indirect water heaters. Commonly, each of these water heater appliances are a compromise between water heater performance values such as: 'peak draw' performance; 'continuous draw' performance; 'first draw' performance; efficiency; operating cost; and initial cost.

Peak draw performance is a measure of how much hot water is available during peak demands. This is normally an increased amount over what the appliance can produce continuously (e.g., continuous draw performance) based on the amount of hot water the appliance is storing. When this peak demand is at the beginning of the hot water draw it is considered a "First Draw Performance". A Peak Draw Value can be expressed as gallons per minute (GPM) at a specific temperature rise for a limited period of time. This temperature rise is a measure of the difference in temperature between the incoming water supplying the water heater appliance and the hot water supplied by the water heater appliance. After that time the temperature of the water delivered will drop.

While conventional water heater appliances attempt to create a good balance of water heater performance values, they typically fail to efficiently provide both good peak draw and continuous draw (or steady state) performance. Accordingly, there is a need in the art to improve the water heater appliance.

SUMMARY OF THE INVENTION

The foregoing needs are met, to a great extent, by the present invention, wherein aspects of a water heater appliance are provided.

An embodiment of the present invention pertains to a hot water heater appliance. The hot water heater appliance includes a boiler, a companion water heater and a controller. The controller is configured to control the water heater appliance in response to a scheduled plurality of performance modes based on a preset schedule. A first performance mode is scheduled to be performed at an expected low usage time and a second performance mode is scheduled to be performed at an expected high usage time relative to the expected low usage time.

Another embodiment of the present invention relates to a companion water heater. The companion water heater includes a hot water storage tank, a heat exchange coil, a lower sensor, an upper sensor, a circulator pump, and an insulating jacket. The heat exchange coil is disposed in the hot water storage tank. The lower sensor is disposed in thermal contact with a lower portion of the hot water storage tank. The upper sensor is disposed in thermal contact with an upper portion of the hot water storage tank. The circulator pump is to urge a flow of a heating fluid to circulate between a boiler and the heat exchange coil. The insulating jacket is disposed around, below, and above the hot water storage tank. The insulating jacket has an expanded polypropylene insulation layer and the insulating jacket includes a plurality of segments releasably fastened to each other.

Yet another embodiment of the present invention pertains to a method of heating water in a water heater appliance. In this method, a plurality of upper portion temperature measurements are received over a time period at a controller configured to control the water heater appliance. The plurality of upper portion temperature measurements are associated with an upper portion of a hot water storage tank disposed in the water heater appliance. A plurality of lower portion temperature measurements are received over the time period at the controller from a lower portion of a hot water storage tank. An upper temperature profile over the time period is determined by the controller based on the plurality of upper portion temperature measurements. A lower temperature profile over the time period is determined by the controller based on the plurality of lower portion temperature measurements. A domestic hot water usage amount is determined by the controller in response to at least one of the upper temperature profile and the lower temperature profile being at a relatively steeper slope than a standby temperature profile. The water is heated in response to the domestic hot water usage being relatively greater than an amount of thermal energy in the hot water storage tank.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
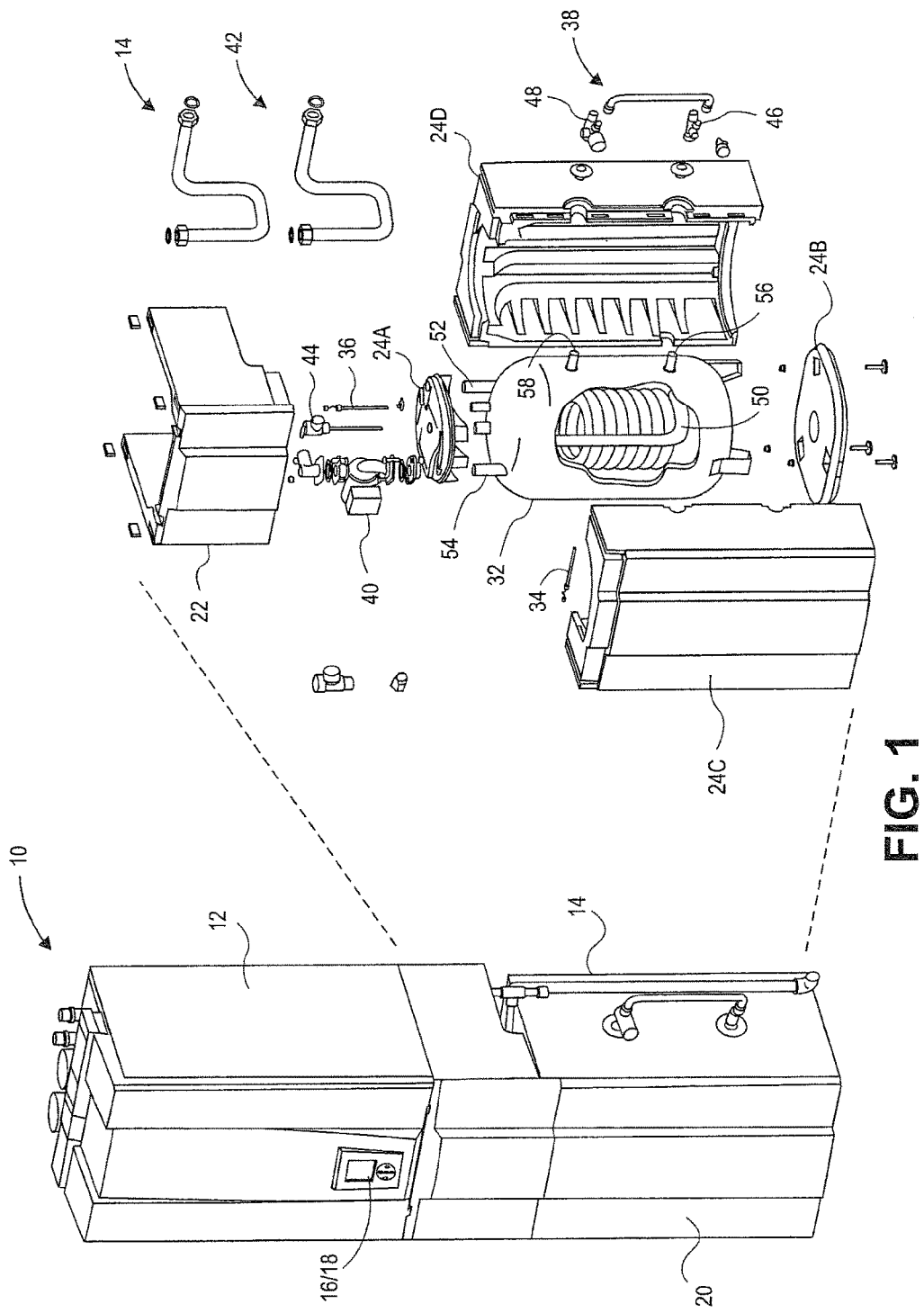
FIG. 1 is a partial cross sectional and exploded view of a hot water heater appliance suitable for use with an embodiment of the present invention.

Various embodiments of the present invention provide for an improved hot water heater appliance that is configured to efficiently provide excellent peak draw and steady state performance and a method of controlling the hot water heater appliance. In some embodiments, the hot water heater appliance includes a variety of performance modes to optimize one type of performance over others. The hot water heater appliance may be configured to remain in a particular performance mode or change from one mode to another depending on a variety of factors such as, for example, a pre-programmed timed schedule, learned schedule, domestic hot water (DHW) draw, and the like. It should be understood, however, that the present invention is not limited to any one performance mode and is generally more efficient and better able to meet DHW draws than conventional water heating appliances. Preferred embodiments of the invention will now be further described with reference to the drawing figures, in which like reference numerals refer to like parts throughout.

Turning now to the drawings, FIG. 1 is a partial cross sectional and exploded view of a hot water heater appliance 10 suitable for use with an embodiment of the present invention. As shown in FIG. 1, the hot water heater appliance 10 includes a boiler 12, a companion water heater 14, and a user interface/controller 16/18. In general, the boiler 12 is configured to provide the energy to heat the DHW. The companion water heater 14 is configured to receive the energy from the boiler 12 to heat the DHW. The user interface 16 is configured to provide for two way communication between a user and the controller 18. In this regard, the user interface 16 includes a display and keys or other such output and input devices. In a particular example, the display includes various menus to select and control modes of operation for the boiler 12 and/or the hot water heater appliance 10. It is a particular advantage of some embodiments that the user interface/controller 16/18 automatically senses installation of the companion water heater 14 and then automatically provide an additional menu for the companion water heater 14. The controller 18 is configured to control the hot water heater appliance 10.

The boiler 12 includes any suitable boiler or device capable of generating delivering energy to the hot water heater appliance 10. More particularly, the boiler 12 is configured to provide heated water suitable to be transported to the location of energy need. Examples of suitable boilers include: gas fired; oil fired; electric; solar; geothermal; or the like. In a particular example, the boiler is a gas fired boiler configured to heat a supply of water that is then circulated between the boiler 12 and the companion water heater 14. A specific example of a suitable boiler includes the WM97+ manufactured by Weil-McLain of Michigan City, Ind. 46360-2388 USA.

As shown in the exploded portion of FIG. 1, the companion water heater 14 includes an insulated jacket 20, hot water storage tank 32, sensors 34 and 36, mixing valve assembly 38, circulator pump 40, boiler connectors 42, temperature and pressure relief valve (T&P relief valve) 44, domestic cold water (DCW) in connector 46, and domestic hot water (DHW) out connector 48. The insulated jacket 20 includes any suitable insulating material. In addition, the insulated jacket 20 includes any suitable protective and/or aesthetically pleasing outer materials. Examples of suitable materials for the insulated jacket 20, include foams, polymers, metals, and the like. In a particular example, the insulated jacket 20 includes expanded polypropylene (EPP). The EPP insulated jacket 20 is configured to provide a structural jacket that may absorb kinetic impacts resiliently while also providing thermal insulation. In some embodiments, the insulated jacket 20 may be made exclusively of EPP and it is an advantage of these embodiments that the EPP material may be colored and have an aesthetically pleasing surface as well as providing sufficient structural and insulating properties.

As shown in FIG. 1, the insulated jacket 20 includes a plurality of portions. These portions include structural, insulating, and aesthetic features that greatly improve the hot water heater appliance 10. For example, the insulated jacket 20 may include a bridge 22, top 24A, bottom 24B, front 24C, and back 24D. The bridge 22 or piping access cover may be configured to provide insulation to the piping in the area between the boiler 12 and the companion water heater 14. In addition, the bridge 22 may be configured to aesthetically integrate the boiler 12 and the companion water heater 14. It is an advantage of this aesthetic integration that the hot water heater appliance 10 may be located in a general living area of a domicile rather than closed away in a utility closet. It is another advantage of this aesthetic integration that the working components of the companion water heater 14 are protected. It is yet another advantage of this aesthetic integration and the good surface properties of EPP that the companion water heater 14 may collect less dust than conventional water heaters and boilers and may be easier to clean. Also shown in FIG. 1, the insulated jacket 20 includes a plurality of openings disposed in cooperative alignment with respective inlets and outlets associated with the hot water storage tank 32.

The top 24A, bottom 24B, front 24C, and back 24D are configured to provide the hot water storage tank 32 with insulation to each respective area. For example the top 24A is configured to insulate the top of the hot water storage tank 32 and reduce loss of heat therefrom via radiant loss, thermal conduction, air convection/infiltration and the like. Similarly, the bottom 24B, front 24C, and back 24D are configured to insulate the bottom, front and back (including the sides) of the hot water storage tank 32 and reduce loss of heat therefrom via radiant loss, thermal conduction, air convection/infiltration and the like.

In some embodiments, the portions of the insulated jacket 20 may be removably attached to each other and/or the hot water storage tank 32. For example, the portions of the insulated jacket 20 may include any suitable fastener such snaps, magnets, or the like that are configured to attach to each other and/or to the hot water storage tank 32. In particular examples, the insulated jacket 20 includes a plurality of fasteners 26A configured to align and attach the bridge 22 to the boiler 12. In this manner, the aesthetic integration of the boiler 12 and companion water heater 14 may be further enhanced by the alignment of one to the other. In addition, the insulated jacket 20 may include magnetic fasteners 26B configured to releasably fasten the front 24C to the back 24D. In this manner, the hot water storage tank 32 may be easily accessed for maintenance evaluation and repair (e.g., welding or other such operation). In contrast, conventional hot water tanks are typically covered in spray foam that renders the tank unserviceable. Another negative aspect of conventional spray foam installations is that moisture may be maintained in contact with the tank. The novel EPP 'clamshell' insulated jacket 20 facilitated drawing or wicking moisture from the surface of the hot water storage tank 32.

Optionally, the top 24A and bottom 24B may include lips or other structures configured to releasably lock into slots, grooves or other such structures in the front 24C and back 24D. If included, these structures lock the top 24A and bottom 24B within the front 24C and back 24D when the front 24C and back 24D are fastened and can be removed when unfastened. In a particular example, the front 24C and back 24D include an annular top slot disposed about an inside portion of the front 24C and back 24D configured to retain the top 24A. In another particular example, the front 24C and back 24D include an annular bottom slot disposed about an inside portion of the front 24C and back 24D configured to retain the bottom 24B. Also optionally, the companion water heater 14 may include leveling feet 28 configured to level and raise or lower the companion water heater 14 in a manner known to those skilled in the art.

The hot water storage tank 32 is configured to receive a supply of domestic cold water and utilize energy in the form of circulating boiler water from the boiler 12 to provide a supply of domestic hot water. The hot water storage tank 32 itself includes a shell of metal or other such material that is sufficiently strong to contain hot water at standard household pressures of 50-70 pounds per square inch (psi) (345-483 kilopascals 'kPa'). The hot water storage tank 32 includes a heat exchange coil 50, exchange inlet 52, exchange outlet 54, DCW inlet 56, and DHW outlet 58.

The sensors 34 and 36 are configured to sense a temperature of the water in the hot water storage tank 32 and forward a signal corresponding to this sensed temperature to the controller 18. The sensors 34 and 36 may include any suitable temperature sensing element such as, for example, a thermocouple, thermistor, or the like. The sensor 34 may be placed in thermal contact with a lower portion of the hot water storage tank 32. In general, the lower portion of the water storage tank 32 represents the lowest temperature in the water storage tank 32 due to the relatively higher density of colder water as compared to warmer water and because the DCW inlet 56 is disposed at the lower portion of the water storage tank 32. The sensor 36 may be placed in thermal contact with an upper portion of the hot water storage tank 32. The upper portion of the water storage tank 32 generally represents to hottest temperatures in the water storage tank 32. As such, the temperature at the upper portion of the water storage tank 32 represents the hottest water that can be delivered at that particular moment.

The mixing valve assembly 38 includes a thermostatic mixing valve configured to mix outgoing DHW with a controlled amount of incoming DCW to produce DHW at a predetermined maximum DHW temperature. This predetermined maximum DHW temperature may be set by the user or a technician on the mixing valve assembly 38 and/or may be controlled by the controller 18. This allows the hot water storage tank to store a relatively greater amount of thermal energy. In this manner, a relatively higher volume of DHW at the predetermined maximum DHW temperature may be provided for a given volume of the hot water storage tank 32.

The circulator pump 40 is configured to urge water to flow or circulate between the boiler 12 and the heat exchange coil 50. The circulator pump 40 is controlled via the controller 18. Typically, the circulator pump 40 is controlled to start circulating the water or other heating fluid between the boiler 12 and the heat exchange coil 50 shortly before the boiler 12 begins to supply energy to the boiler water and then continues to circulate for some predetermined time after the boiler 12 stops supplying energy to the boiler water or until a predetermined cool down temperature in the boiler is reached. The circulator pump 40 may, optionally, include a check valve to stop or reduce the flow of water between the boiler 12 and the heat exchange coil 50 while the circulator pump 40 is unpowered. This unpowered flow may draw out heat from the hot water storage tank 32 if left unchecked.

The connectors 42 may include any suitable conduit and/or fittings for conveying boiler water between the boiler 12 and companion water heater 14. In a particular example, the connectors 42 include flexible stainless steel piping suitable for fluidly connecting the boiler 14 to the companion water heater 14.

In general, the heat exchange coil 50 is configured to provide a conduit for water or other heated fluid from the boiler 12 to be conveyed through the hot water storage tank 32 and to exchange the heat therein with the water in the hot water storage tank 32. Of note, the boiler water and DHW are not mixed, but rather, heat from the boiler water is imparted upon the DHW through the material making up the heat exchange coil 50. To efficiently exchange this heat, the heat exchange coil 50 may be made from a conductive material such as metal and may have a relatively long, circuitous path. In addition, the heat exchange coil 50 may optionally include radiating fins or other such implement to increase thermal exchange. In other examples, the heat exchange coil 50 may be an external, jacket-style heat exchange or other such heat exchanger.

Figure 2:
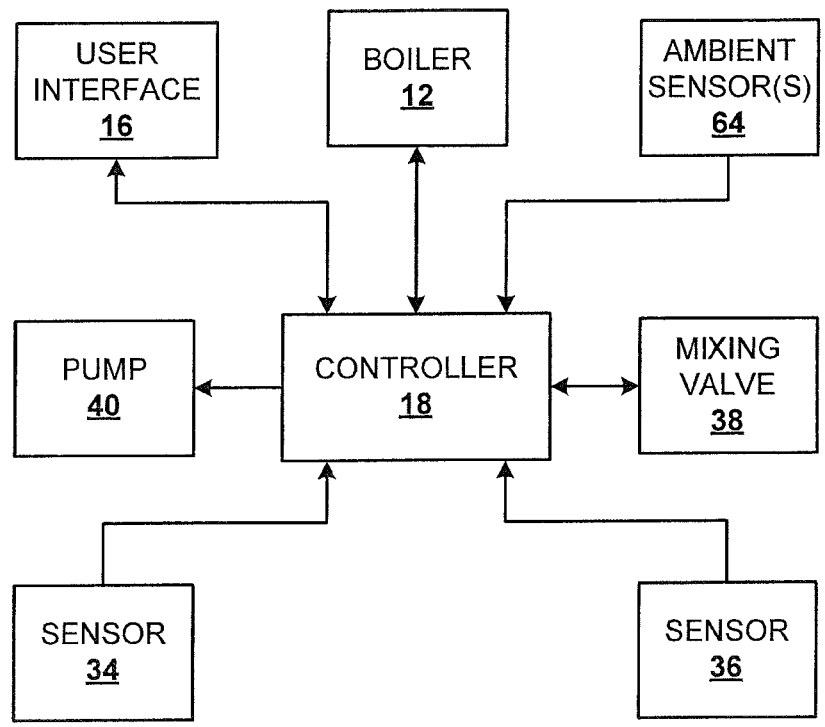
FIG. 2 is a block diagram of a system architecture for the hot water heater appliance depicted in FIG. 1.

FIG. 2 is a block diagram of a system architecture for the hot water heater appliance 10 depicted in FIG. 1. As shown in FIG. 2, the controller 18 may be configured for two way communication between the boiler 12, user interface 16, sensors 34 and 36, and circulator pump 40. In addition, the controller 18 is optionally configured for two way communication between the mixing valve assembly 38 and/or an ambient sensor 64. In operation, the controller is configured to receive user input from the user interface 16 and, based on this user input, control the various other components of the hot water heater appliance 10 to provide DHW. The controller 18 may determine one or more aspects of the temperature within the hot water storage tank 32 via the sensed conditions at the sensors 34 and 36. For example, if the temperature at the sensor 34 is dropping relatively quickly, the controller 18 may determine DHW is being drawn out quickly (and DCW is being drawn in quickly to replace it). In another example, if the temperature at both the sensors 34 and 36 are falling very slowly, then the controller 18 may determine that little or no DHW is being drawn out. As such, the controller 18 may be able to accurately determine draw without the added complication of a flow meter.

Control of the boiler 12 may include sensing temperatures at one or more locations, sensing gas or fuel flow, ignition, ventilation control, and the like. These and other aspects of controlling a conventional non-condensing or condensing boiler are generally known to those skilled in the art. If the optional ambient sensor 64 is included, the controller 18 is configured to sense the ambient temperature and the ambient temperature may be factored into the control of the hot water heater appliance 10. For example, temperature loss in the hot water storage tank 32 is a function of the difference in temperatures between the hot water storage tank 32 and the ambient temperature. To reduce thermal loss at time of relatively low ambient temperature, the controller 18 may maintain the temperature in the hot water storage tank 32 at a relatively lower temperature. In another example, at times of relatively low ambient temperature, DHW water usage may rise or fall depending upon the habits of the users of the DHW. The controller 18 may be configured to facture in ambient temperature in order to learn DHW usage trends. These DHW usage trends may be factored into the control of the hot water heater appliance 10 to supply sufficient DHW efficiently.

Figure 3:
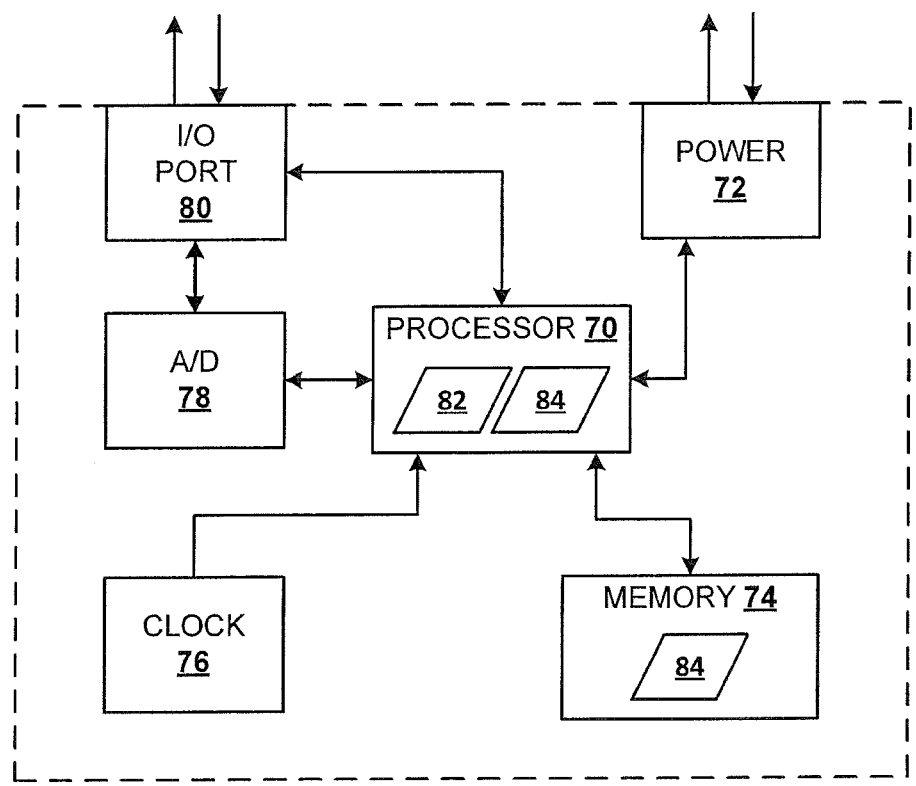
FIG. 3 is a block diagram of a controller for the hot water heater appliance depicted in FIG. 1.

FIG. 3 is block diagram of the controller 18 for the hot water heater appliance 10 depicted in FIG. 1. As shown in FIG. 3, the controller 18 includes a processor 70. This processor 70 is operably connected to a power supply 72, memory 74, clock 76, analog to digital converter (A/D) 78, and an input/output (I/O) port 80. The I/O port 80 is configured to receive signals from any suitably attached electronic device and forward these signals to the A/D 78 and/or the processor 70. For example, the I/O port 80 may receive signals associated with temperature measurements from one or more of the sensors 34, 36, and 64 and forward the signals to the processor 70. In another example, the I/O port 80 may receive signals via the user interface 16 shown in FIGS. 1 and 2 and forward the signals to the processor 70. If the signals are in analog format, the signals may proceed via the A/D 78. In this regard, the A/D 78 is configured to receive analog format signals and convert these signals into corresponding digital format signals. Conversely, the A/D 78 is configured to receive digital format signals from the processor 70, convert these signals to analog format, and forward the analog signals to the I/O port 80. In this manner, electronic devices configured to receive analog signals may intercommunicate with the processor 70.

The processor 70 is configured to receive and transmit signals to and from the A/D 78 and/or the I/O port 80. The processor 70 is further configured to receive time signals from the clock 76. In addition, the processor 70 is configured to store and retrieve electronic data to and from the memory 74. Furthermore, the processor 70 is configured to determine signals operable to modulate the boiler 12 and thereby control the amount of heat imparted to the hot water storage tank 32. For example, in response to the processor 70 determining the water in the hot water storage tank 32 is below a predetermined minimum temperature, the processor 70 may forward signals to the various components of the boiler 12 and the circulator pump 40 to provide heat to the heat exchange coil 50 and thereby heat the water in the hot water storage tank 32.

According to an embodiment of the invention, the processor 70 is configured to execute a code 82. In this regard, the controller 18 includes a set of computer readable instructions or code 82. According to the code 82, the controller 18 is configured to modulate an amount of energy imparted into the hot water storage tank 32 by the boiler 12. In addition, the controller 18 may be configured to generate and store data to a file 84. This file 84 includes one or more of the following: sensed temperatures; timestamp information; determined temperature profiles (e.g., rate at which the temperature is rising or falling); user input temperature profiles; recommended temperature profiles; DHW usage trends; heating schedules of various performance modes; and the like.

Based on the set of instructions in the code 82 and signals from one or more of the sensors 34, 36, and 64, the processor 70 is configured to: determine the thermal capacity presently in the hot water storage tank 32; determine the temperature profile of the water in the hot water storage tank 32; determine the outflow of DHW from the hot water storage tank 32 based on the temperature profile; determine DHW usage trends; and determine whether the thermal capacity presently in the hot water storage tank 32 is sufficient for the expected usage based on DHW usage trends or current water temperatures based on signals from the sensors 34 and/or 36. For example, the processor 70 receives the sensed temperature and/or an average sensed temperature, compares this to previous temperatures over time to determine the current temperature profile. The processor 70 compares the current temperature profile to expected thermal loss without DHW usage (e.g., standby loss) to determine if usage is occurring and, if so, how much. In some performance modes, the processor 70 determines whether this amount of usage will exceed the thermal capacity of the hot water storage tank 32 and may fire the boiler 12 proactively to prevent the temperature of the outflow DHW from falling below a predetermined minimum. In other performance modes, the processor 70 may wait until the temperature of the outflow DHW falls below the predetermined minimum before controlling the boiler 12 to fire. In addition, if the processor 70 determines that no DHW draw is occurring, the processor 70 may wait until a draw occurs before controlling the boiler 12 to fire. Optionally, processor 70 may be configured to periodically raise the temperature above a biological killing temperature in order to insure biological growth does not occur. For example, even if a user selects maximum temperature below the biological killing temperature, the processor 70 may periodically raise the temperature above the maximum temperature and the biological killing temperature in order to ensure biological growth does not occur.

In various examples, knowing the temperature at the bottom and top of the hot water storage tank 32, by virtue of the sensors 34 and 36 respectively, facilitates a greater flexibility and improved efficiency as compared to systems without such capabilities. In a first example, the processor 70 may use information on incoming water temperature (as sensed by the temperature sensor 34, for example) to adjust the temperature profile to use the minimum energy needed to satisfy the DHW demand. In a particular example, in the summer, warmer ground water temperature would require less energy to raise the delivered DHW to the same temperature as in the winter. As such, a lower boiler water deliver temperature may be able to satisfy the same flow rate in the summer as a higher delivery temperature would in the winter. Lower boiler water temperatures allow the boiler 12 to run at a higher efficiency.

In a second example, by knowing the temperature at both the top and bottom of the tank, the processor 70 may change the target boiler water temperature during a DHW draw in order to most effectively meet the demand. The processor 70 may increase the delivery temperature to facilitate transferring maximum energy to the DHW. Also, in response to signals from the sensor 36, the processor 70 may determine that the top of the hot water storage tank 32 has reached its targeted temperature and may change (decrease) the target boiler water temperature in order to limit the energy added to the top of the hot water storage tank 32 while still adding energy to the colder water at the bottom of the hot water storage tank 32. This feature of the processor 70 drastically increases the thermal storage of the hot water storage tank 32 by adding the maximum amount of energy to the hot water storage tank 32 while preventing the hottest water in the hot water storage tank 32 from greatly overshooting its target temperature and is a great improvement in the art. This symptom of overshooting a targeted DHW delivery temperature is known to those familiar with the art as thermal stacking. Thermal stacking can, in some circumstances, lead to significantly hotter DHW than desired due to adding excessive energy to the top of the storage tank in order to recover the colder water in the tank to the desired temperature. It is an advantage of embodiments described herein that significantly greater control over this negative performance characteristic is provided as compared to conventional storage water heaters.

Figure 4:
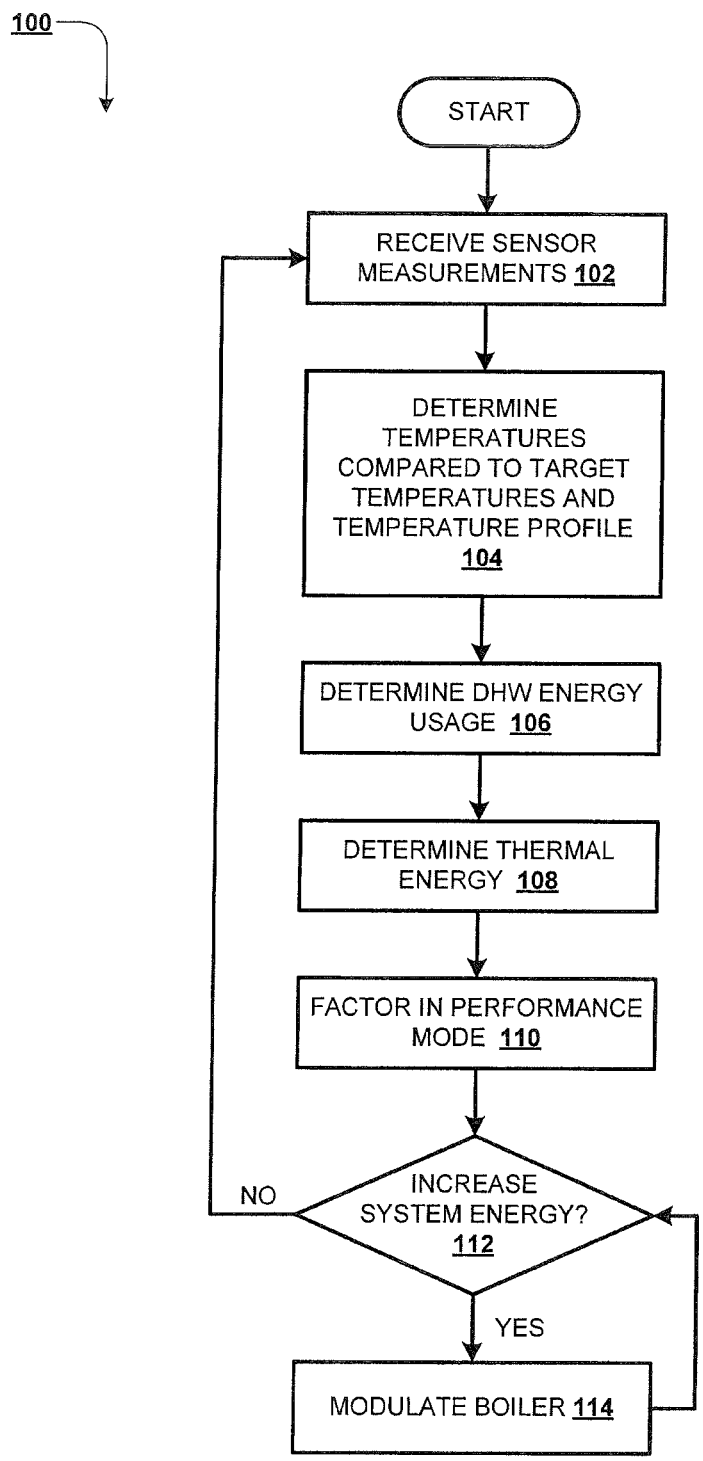
FIG. 4 is a block diagram of a method of controlling the hot water heater appliance according to an embodiment of the present invention.

FIG. 4 is a block diagram of a method 100 of controlling the hot water heater appliance 10 according to an embodiment of the present invention. Prior to performance of the method 100, the hot water heater appliance 10 may be installed. It is an advantage of the hot water heater appliance 10 that the various components to connect the boiler 12 to the hot water storage tank 32 are packaged as a kit and flexible to allow connection to a variety of boiler configurations. For example, the boiler connectors 42 are flexible to allow for different placement of inlet and outlet from the boiler 12. Prior to and/or during performance of the method 100, various program parameters may be input and stored to the file 84. For example, the user or a technician may select a performance mode such as, for example: Off-Disabled which is generally for service; High performance which delivers the highest performance and maximizes the thermal energy stored in the hot water storage tank 32; Normal performance which delivers a balance of performance and energy efficiency; Economy which delivers the most energy efficiency; Vacation mode which maintains the water in the hot water storage tank 32 at a temperature sufficient to deter freezing; and Scheduled which provides the user with the capability to schedule different performance modes to be performed at different times of the weekday and/or weekend; and Learning mode which may accept some initial user input and then learn DHW usage trends and alter the performance mode based on the DHW usage trend.

At step 102, the controller 18 receives sensor measurements. For example, some or all of the sensors 34, 36, and 64 may forward signals corresponding to the temperature sensed by the sensors to the controller 18.

At step 104, the controller 18 may determine temperatures at the various locations, compare these sensed temperatures to target temperatures, determine one or more temperature profiles over time, and compare those one or more temperature profiles to predetermined temperature profile(s). For example, based on these forwarded signals, the controller 18 may determine the temperature at the lower and upper portion of the hot water storage tank 32 and, optionally, the ambient temperature. These determined temperatures may be compared to a target temperature range and/or a target temperature for the lower and upper portion of the hot water storage tank 32, respectively. If the determined temperatures fall outside the target temperature range or below the target temperatures, the controller 18 may be configured to determine an action to rectify the determined temperatures. In a particular example, if the determined temperatures at the upper portion of the hot water storage tank 32 falls below the target temperature for the upper portion of the hot water storage tank 32, the controller 18 may be configured to modulate the boiler at step 114 to increase the energy delivered to the hot water storage tank 32.

As described herein, a large disparity in temperatures between the lower and upper portion of the hot water storage tank 32 may lead to an unwanted condition of 'thermal stacking'. It is an advantage of embodiments described herein that the controller 18 may be configured to identify temperature disparities that exceed a predetermined maximum temperature variance and act to rectify the temperature disparity. In a particular example, the controller 18 may be configured to lower the energy in the boiler water delivered to the hot water storage tank 32 via the heat exchange coil 50. As a result, energy can be imparted into portions of hot water storage tank 32 with lower temperatures while not significantly raising the temperature of portions of hot water storage tank 32 with higher temperatures. In addition, depending on the boiler 12 (e.g., heat source), generating lower energy boiler water may be more efficient than generating higher energy boiler water. The efficiencies of the boiler 12 at various energy levels may be factored into determining the energy of the boiler water delivered to the hot water storage tank 32 via the heat exchange coil 50.

Over time, at step 104, a temperature profile may be determined for the lower and upper portion of the hot water storage tank 32 and, optionally, the ambient temperature.

At step 106, the controller 18 may be configured to determine DHW usage. For example, the temperature profiles of the lower and upper portion of the hot water storage tank 32 and/or an average thereof may be compared to standby loss. If these profiles closely match or match within a predetermined amount, it may be determined that no DHW is being drawn. If these profiles do not match, the rate at which the sensed temperature profiles are falling may be used to determine DHW usage.

At step 108, the controller 18 may be configured to determine the amount of thermal energy presently stored in the hot water storage tank 32. For example, the temperature at the lower and upper portion of the hot water storage tank 32 may be used to determine an average temperature or calculate a thermal gradient within the hot water storage tank 32 and that value is then multiplied by the volume of water in the hot water storage tank 32.

At step 110, the selected performance mode may be factored into the determination about whether to add heat to the hot water storage tank 32. For example in some performance mode, the controller 18 may be configured to add thermal energy to the hot water storage tank 32 in anticipation of outflow DHW falling below the predetermined minimum. In other performance modes, the controller 18 may be configured to wait until the temperature of the outflow DHW falls below the predetermined minimum before adding thermal energy to the hot water storage tank 32.

In general, the various performance modes provide a combination of operating parameters of the hot water heater appliance 10 that provide the user of the hot water heater appliance 10 with the ability to select one general mode over another without having to explicitly program each operating parameter. For example, if the user selects the 'Economy Mode' and then a particular desired DHW temperature, the controller 18 may be configured to adjust the temperature at the upper portion of the hot water storage tank 32 to be near or at the desired DHW temperature and also control the boiler 12 to deliver boiler water to the hot water storage tank 32 at or slightly above the desired DHW temperature. Use of the performance modes greatly simplifies the operation of the hot water heater appliance 10 for the user. Through calculations and lab testing, the performance modes have been developed that can be selected by the user and that that optimize the parameters (tank storage temperature, boiler temperature, on/off temperature differentials, and others). These can range from "Economy" mode to provide the best efficiency when producing hot water, "High Performance"

mode that provides the maximum amount of hot water at the expense of efficiency, "Vacation" to use a minimum amount of energy to keep the hot water storage tank 32 from freezing, and other modes.

It is another benefit of some embodiments that the performance modes may be scheduled by a technician or the user. The user interface 16 provides the user with the ability to set the schedule of when the different performance modes may be active. For example, the "High Performance" mode may be scheduled in the morning hours when hot water usage is high. The hot water heater appliance 10 can be scheduled to then shift over to an "Economy" mode or even "Off" during times the building would not be occupied. This differs from conventional DHW supply systems that require the contractor or user to program this schedule. In yet another embodiment, the scheduling of the various modes may be based on historical usage. For example, the hot water heater appliance 10 may be configured to learn that DHW usage increases at 7 am each weekday morning followed by a period of no usage for 9 hrs and then some small DHW draws between 6 pm and 11 pm. These and other learned DHW usage habits may then be used to develop a schedule that maximizes DHW availability and efficiency.

At step 112, the controller 18 may determine whether or not to add thermal energy to the hot water storage tank 32. For example, the controller 18 may utilize the determined values, preset temperatures, preset performance mode. Based on the set of instructions in the code 82, these and other factors may be weighed to determine if thermal energy is to be added to the hot water storage tank 32. The plurality of sensors 34 and 36 facilitates greater flexibility and efficiency of the system. The combination of the two sensors 34 and 36 can detect both the high temperature at the upper portion of the hot water storage tank 32 as well as the lower temperatures at the lower portion of the hot water storage tank 32. Monitoring the current value of these sensors as well as their rate of change can help the controller 18 determine the inferred load on the boiler 12. If the upper sensor 36 slowly drops in temperature, this can be indicative of a natural standby loss of the hottest part of the tank and the controller 18 can be configured to then respond with a high efficiency recovery because there is no immediate need for hot water. If the lower temperature sensor 34 begins to drop the controller 18 can determine if this is indicating a flow rate of cold water coming into the hot water storage tank 32. This can be used in lieu of a flow sensor with the added benefit of temperature measurement that can be used for other functions. Based on the speed of the temperature decrease at the lower temperature sensor 34, the controller 18 can determine the size of the heat demand and the boiler 12 or other such energy source can be controlled to respond accordingly. If the controller 18 detects a drop in temperature at the lower sensor 34 followed by a drop in temperature at the upper sensor 36, this can indicate a very large flow/demand for hot water and the boiler 12 can be controlled to aggressively add energy to the hot water storage tank 32 to try to meet the demand and recover the tank temperature. Of note, the location and orientation of the sensors 34 and 36 depicted in FIG. 1 are for illustrative purposes only and may each be located higher or lower on the hot water storage tank 32 and may be oriented in any suitable manner.

In some DHW drawing circumstances, the controller 18 may determine that a total tank recovery procedure is warranted. In conventional systems with a single sensor, overheating the tank is a common problem. When trying to recover the tank temperature with a high temperature in the coil or inner tank (or any other type of heat exchanger) a portion of the domestic tank can experience overheating due to the fact that the boiler or energy source will continue to add heat to the tank until the sensor location has reached temperature. Often the sensor is not located at the highest temperature location in the tank, which causes the excess heat to be added to the tank. In various embodiments described herein, the controller 18 is configured to control the boiler 12 to deliver a high energy boiler water to recover the energy within the hot water storage tank 32 quickly, and then in response to the upper sensor 36 (or wherever the highest temperature sensor is located) sensing the target temperature, the boiler 12 is controlled to deliver a lower energy boiler water to continue to add heat to the hot water storage tank 32 without the potential or ability to heat any part of the hot water storage tank 32 over the desired value. In a particular example, the boiler 12 is controlled to deliver a boiler water at the target temperature of the hot water storage tank 32 in response to the temperature at the upper portion of the hot water storage tank 32 having reached the target temperature but the lower portion of the hot water storage tank 32 still being below the target temperature. In this manner, overheating is reduced or prevented while allowing the hot water storage tank 32 to reach a maximum amount of energy heat stored within the hot water storage tank 32. The boiler 12 may be controlled to continue to add energy until it can no longer modulate down any further because the hot water storage tank 32 is no longer absorbing energy and the return water temperature coming back to the boiler increases and the outlet water rises above the target temperature and the boiler 12 is then controlled to shut off. This "Total Tank Recovery" has essentially fully charged the hot water storage tank 32 as if it was a thermal battery. The first portion of the recovery being a high performance mode heating and the last portion of the recovery being performed at high efficiency mode heating.

If it is determined that thermal energy is to be added to the hot water storage tank 32, then, at step 114, the boiler 12 is controlled to increase energy output and the circulator pump 40 is controlled to urge the flow of water to circulate between the boiler 12 and the heat exchange coil 50. Following the step 114, it is determined if further thermal energy is to be added to the hot water storage tank 32 and this is continued until it is determined that the hot water storage tank 32 has sufficient thermal energy. Of note, in order to make this determination, the temperature of the water in the hot water storage tank 32 is continually or periodically sensed. If it is determined that the hot water storage tank 32 has sufficient thermal energy, the temperatures are sensed at step 102.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hot water heater appliance, comprising:
   a boiler to heat a boiler water;
   a companion water heater to supply a domestic hot water;

a heat exchange coil disposed in the companion water heater configured to convey the boiler water through the heat exchange coil and return the boiler water to the boiler; and a controller configured to control the water heater appliance in response to a scheduled plurality of performance modes based on a preset schedule, wherein a first performance mode is configured to heat the domestic hot water in the companion water heater solely by indirect heating from the boiler water supplied by the boiler, the domestic hot water in the companion water heater being heated to a predetermined temperature relatively more efficiently as compared to others of the plurality of performance modes by providing a supply of the boiler water to the heat exchange coil at a temperature that is the same as the predetermined temperature in the companion water heater and wherein less energy is wasted due to a difference in temperature between the boiler water and the domestic hot water in the companion heater being reduced as compared to others of the plurality of performance modes, the first performance mode is scheduled to be performed at an expected low usage time and a second performance mode is configured to generate relatively greater thermal energy stored in the companion water heater compared to others of the plurality of performance modes by controlling a target boiler water temperature, the second performance mode is scheduled to be performed at an expected high usage time relative to the expected low usage time.

2. The hot water heater appliance according to claim 1, further comprising:
a user interface to provide a display to the user and a keypad for the user to input settings.

3. The hot water heater appliance according to claim 1, further comprising:
a hot water storage tank disposed in the companion water heater.

4. The hot water heater appliance according to claim 3, further comprising:
a heat exchange coil disposed in the hot water storage tank.

5. The hot water heater appliance according to claim 4, further comprising:
a lower sensor disposed in thermal contact with the lower portion of the hot water storage tank; and
an upper sensor disposed in thermal contact with the upper portion of the hot water storage tank.

6. The hot water heater appliance according to claim 5, further comprising:
a circulator pump to urge a flow of a heating fluid to circulate between a boiler and the heat exchange coil.

7. The hot water heater appliance according to claim 3, further comprising:
an insulating jacket disposed around, below, and above the hot water storage tank, the insulating
jacket having an expanded polypropylene insulation layer and the insulating jacket including a plurality
of segments releasably fastened to each other.

8. The hot water heater appliance according to claim 1, further comprising:
an ambient sensor to sense an ambient temperature.

9. A companion water heater comprising:
a hot water storage tank;
a heat exchange coil disposed in the hot water storage tank;
a lower sensor disposed in thermal contact with a lower portion of the hot water storage tank;
an upper sensor disposed in thermal contact with an upper portion of the hot water storage tank;
a circulator pump to urge a flow of a heating fluid to circulate between a boiler and the heat exchange coil;
an insulating jacket disposed around, below, and above the hot water storage tank, the insulating jacket having an expanded polypropylene insulation layer and the insulating jacket including a plurality of segments releasably fastened to each other; and
a controller configured to control the water heater appliance in response to a scheduled plurality of performance modes based on a preset schedule, wherein a first performance mode is configured to heat water in the companion water heater solely by indirect heating from the heating fluid supplied by the boiler, the water in the companion water heater being heated to a predetermined temperature relatively more efficiently as compared to others of the plurality of performance modes by providing a supply of the heating fluid to the heat exchange coil at a temperature that is the same as the predetermined temperature in the companion water heater and wherein less energy is wasted due to a difference in temperature between the heating fluid and the water in the companion heater being reduced as compared to others of the plurality of performance modes, the first performance mode is scheduled to be performed at an expected low usage time and a second performance mode is configured to generate relatively greater thermal energy stored in the companion water heater compared to others of the plurality of performance modes by controlling a target boiler water temperature, the second performance mode is scheduled to be performed at an expected high usage time relative to the expected low usage time.

10. The companion water heater according to claim 9, further comprising:
a thermostatic mixing valve assembly.

11. The companion water heater according to claim 9, further comprising:
an ambient sensor to sense an ambient temperature.

12. The companion water heater according to claim 9, further comprising:
a plurality of flexible connectors to fluidly connect the heat exchange coil with the boiler.

13. The companion water heater according to claim 9, further comprising:
a domestic hot water outlet fluidly connected to the hot water storage tank to supply domestic hot water.

14. The companion water heater according to claim 13, further comprising:
a domestic cold water inlet fluidly connected to the hot water storage tank to replenish water drawn from the hot water storage tank.

15. The companion water heater according to claim 12, further comprising:
a temperature and pressure relief valve fluidly connected to the hot water storage tank.

16. A method of heating a domestic hot water in a water heater appliance, the method comprising the steps of:
receiving a plurality of upper portion temperature measurements over a time period at a controller configured to control the water heater appliance, the plurality of upper portion temperature measurements being associated with an upper portion of a hot water storage tank disposed in the water heater appliance;

receiving a plurality of lower portion temperature measurements over the time period at the controller from a lower portion of a hot water storage tank;

determining an upper temperature profile over the time period by the controller based on the plurality of upper portion temperature measurements;

determining a lower temperature profile over the time period by the controller based on the plurality of lower portion temperature measurements;

determining a domestic hot water usage amount by the controller in response to at least one of the upper temperature profile and the lower temperature profile being at a relatively steeper slope than a standby temperature profile; and heating the water in response to the domestic hot water usage being relatively greater than an amount of thermal energy in the hot water storage tank; and scheduling a plurality of the performance mode to occur at predetermined times;

heating the domestic hot water in the companion water heater solely by indirect heating from a boiler water supplied by a boiler, the domestic hot water in the companion water heater being heated to a predetermined temperature relatively more efficiently as compared to others of the plurality of performance modes by providing a supply of the boiler water to a heat exchange coil disposed in the companion water heater at a temperature that is the same as the predetermined temperature in the companion water heater and wherein less energy is wasted due to a difference in temperature between the boiler water and the domestic hot water in the companion heater being reduced as compared to others of the plurality of performance modes in response to the first performance mode being scheduled; and controlling a target boiler water temperature to generate relatively greater thermal energy stored in the hot water storage tank compared to others of the plurality of performance modes in response to a second performance mode being scheduled.

17. The method according to claim 16, further comprising the step of:

utilizing a performance mode stored to a computer file in the controller to determine when to heat the water in response to the domestic hot water usage being relatively greater than an amount of thermal energy in the hot water storage tank.

18. The method according to claim 16, further comprising the step of:

determining the thermal energy in the hot water storage tank with the controller based on the plurality of upper portion temperature measurements and the plurality of lower portion temperature measurements.

\* \* \* \* \*